United States Patent Office 3,834,932
Patented Sept. 10, 1974

3,834,932
METHOD OF FORMING PLASTIC SANDWICH
STRUCTURES
Karl Brandl, Ruschlikon, Switzerland, assignor to
Lonza Ltd. Switzerland
No Drawing. Filed Aug. 5, 1971, Ser. No. 169,528
Claims priority, application Switzerland, Aug. 28, 1970,
12,901/70
Int. Cl. B32b 27/08, 27/36
U.S. Cl. 117—47                                    9 Claims

ABSTRACT OF THE DISCLOSURE

Method of improving the processability and adhesion characteristics of foamed plastics used as core material for plastic sandwich structures, wherein the core of foamed plastic is coated with a coating material of reinforced, unsaturated polyester resin which contains styrene as cross-linking component, a hardener and an accelerator. In accordance with the invention and prior to applying the coating material to the core, an accumulation of accelerator is provided in the contact zone between the core and the coating material for promoting cold-hardening of the coating material. The hardening of the coating material in the contact zone is thus accelerated.

FIELD OF INVENTION

The invention relates to a procedure for improving the processability and adhesion characteristics of foamed plastics which are used as core material in sandwich structures wherein the core material is coated with cover layers of reinforced, unsaturated styrene modified polyester resins. The term "foamed plastics" for the purposes of this application is deemed to refer to foamed structures having substantially closed pores or cells and which exhibit mechanical properties and strength characteristics suitable for sandwich structures. Suitable plastics for the purposes of this invention are foams of cellulose acetate, phenol resin, epoxy resin, polyester resin, acrylic resin and methacrylic resin. Preferred foamed plastics for the purposes of this invention are foamed structures of hard polyvinyl chloride and/or polyurethane.

BACKGROUND INFORMATION AND PRIOR ART

It has previously been proposed to form plastic sandwich structures by coating a foamed plastic body or core with a coating material of unsaturated polyester resin containing styrene monomer as cross-linking component. As is well known, such coating material, however, has the disadvantageous characteric of tending to penetrate into the interior of the foamed core. Further, the coating material attacks the core structure by solvent action causing swelling and softening of the core body. In some instances the attack of the coating material on the core may result in destruction of the latter, particularly if the still uncured polyester resin is permitted to contact the core body for a prolonged period of time. The destructive influence of the coating material thus negatively affects the mechanical characteristics of the core. Further, the desired cross-linking of the resinous coating material is not fully achieved, at least in the strata adjacent the core surface. This in turn results in insufficient bonding or adhesion of the coating to the core structure so that the total strength of the ultimate sandwich structure is considerably decreased. It should also be considered that partial migration of the monostyrene into the interior of the core deprives the coating material of substantial amounts of monomer so that the styrene cannot quantitatively fulfill its function as cross-linking agent in the polyester moiety. Due to insufficient cross-linking, the hardening or curing of the polyester resin is thus delayed if not prevented. With a view to overcoming the destructive tendency of the styrene, it has previously been proposed to "seal" the surfaces of the core body with, for example, rapidly hardening highly reactive polyester resins. This procedure, however is exceedingly cumbersome and prohibitively raises the manufacturing costs. Further, the admixture of such polyester resins has only a limited effect since the "seal" which is obtained in this manner, is very thin and discontinuous. Due to the pore structure of the core body, it is thus not possible to obtain a continuous sealing film but after about two hours the monostyrene migrates through gaps in the film or softens the film thereby obviating the desired sealing effect.

In order to overcome the damaging influence of the styrene on foamed plastics it has also been proposed to combine the "seal," referred to above, with relatively brief hardening or pot times for the polyester resin. While these proposals constituted an improvement, it should be appreciated that such a procedure is not feasible in respect to sandwich structures of large areas which cannot be completely assembled and completed within the brief pot times and in one working step. Accordingly, brief pot times are disadvantageous in respect to structures of large surfaces and can successfully be used only if the manufacturing procedure is carried out in several steps. Further, a short pot time for the polyester resin has the disadvantageous effect of a pronounced exothermic reaction. Exothermic reactions, however, are to be avoided particularly in respect to thick walled sandwich structures with large surfaces, since otherwise significant shrinking, stress and deformation phenomena occur resulting in an unsatisfactory product.

Finally, it has been proposed to admix the unsaturated polyester containing coating material yith an ethylenically unsaturated polymerizable material.

The closest prior art known to applicant is embodied by U.S. Pats. 3,166,434 and 3,431,319.

The manufacture of sandwich structures by coating a foamed core with unsaturated, styrene modified reinforced polyester resins is usually carried out by the manual lay-up method or by a spraying procedure, the so-called resin and fiber spray-up method. In this procedure the hardening or curing of the polyester resins takes place at room temperature by admixing the coating material with a hardener and an accelerator. Generally, the industry distinguishes between two different hardener-accelerator systems:

System 1

(a) Hardener: hydroperoxide as, for example, methylethylketone peroxide, and
(b) Accelerator: metal soaps, such as for example, cobalt-naphthenate, cobalt-octoate, cobalt-II-chloride, and the like.

System 2

(a) Hardener: organic peroxide, as for example, benzoylperoxide, laurylperoxide, and the like
(b) Accelerator: tertiary amine, as for example, dimethylaniline, diethylaniline, and the like.

The hardening course and the hardening time can be readily controlled and adjusted by varying the quantities of the two components of the respective system.

SUMMARY OF THE INVENTION

It is a primary object of the present invention to overcome the disadvantages and drawbacks of the prior art procedures and to provide a method of coating foamed plastic core structures with unsaturated polyester resin containing styrene as cross-linking component wherein the destructive influence of the styrene is successfully avoided while at the same time resulting in coated products of superior quality.

Generally it is an object of the invention to improve on the art of coating foamed core structures with coating compositions of the kind referred to.

Briefly and in accordance with this invention an accumulation of accelerator is provided in the contact zone between the core and the coating material for promoting cold hardening of the coating material, whereby hardening of the coating material is accelerated in the contact zone. The core material, prior to being coated with the coating material is thus prepared with an accelerator suitable for inducing the cold hardening of the polyester resin so that, when the coating material is applied to the core, the accelerator which thus is present in the contact zone between the coating material and the core proper, comes into contact with the coating composition which likewise contains an accelerator as well as a hardener. In this manner a local concentration of accelerator is present in the contact zone which causes rapid hardening of the coating material in the strata adjacent the core. The accelerator of the accumulation adjacent the core body may be of the same composition as the accelerator contained in the coating material.

The local concentration of accelerator in the boundary region polyester resin-foamed core activates the hardening of the coating material in the boundary region in a beneficial manner. Due to the fact that the coating material rapidly hardens in the boundary region, an excellent and reliable adhesion of the coating material to the core proper is achieved. Further, the rapidly hardening stratum or layer adjacent the core prevents migration of monostyrene from the still unhardened coating material into the core interior thereby in turn avoiding the dreaded softening, swelling or destruction of the core. The hard layer of coating material which is thus formed on the core before the major portion of the coating material hardens, forms in fact a barrier for the monomeric styrene, preventing penetration of the latter into and contact of the latter with the core. However, it should be emphasized that the rapidly hardening boundary layer does not have any negative influence on the hardening time of the remaining quantity of resin in the coating material. Thus, the hardening time for the bulk of the coating material may be appreciably longer, the crux being the rapid hardening of the coating material in the boundary region adjacent the core.

The accumulation of accelerator in the boundary or contact region may be accomplished by applying the accelerator onto the surface of the core body or by incorporating the accelerator into the core body during the manufacture of the latter.

As previously set forth, the composition of the accelerator which is accumulated adjacent to or on the core may be the same as that of the accelerator contained in the coating material proper.

If the hardening system for the polyester resin consists of hydroperoxides-metal soaps, to wit, corresponds to System 1 discussed above, then the accumulation of accelerator advantageously consists of metal soaps. By contrast, if the hardening system for the coating material consists of peroxides-amines, to wit, corresponds to System 2 discussed above, then the accumulation consists advantageously of amines.

The following hardeners (catalysts) may advantageously be used for the inventive purposes: hydroperoxides, such as for example, methylethylketone peroxide, cyclohexanonperoxide, dicyclohexylhydroperoxide or organic peroxides, such as for example, benzoylperoxide, butylperbenzoate or laurylperoxide.

A variety of accelerators may be employed for the inventive purposes. Suitable examples are metal soaps, such as the naphthenates, octoates, chlorides, linoleates and resinates of cobalt, manganese, vanadium, nickel, copper, iron or cerium. Further, amines, such as for example, dimethylaniline and diethylaniline, may be used.

The amount of accelerator contained in the accumulation referred to is not critical and can be readily determined by suitable experiments. Generally speaking, however, very small amounts are sufficient for most purposes. Thus, experiments have indicated that 0.05 mg. of accelerator, calculated on the solid content, per cm.$^2$ of core surface are sufficient in order to achieve the desired effect.

As previously stated, the accumulation of accelerator referred to may be provided by applying the accelerator onto the surface of the core material or by incorporating the accelerator into the core material during its manufacture. Core materials which have been prepared with accelerator by applying the accelerator to the surface of the core have an indefinite life and may be stored and shipped with the accelerator applied thereto. The coating may be effected at a much later time. No inactivation of the accelerator takes place even if the cores with the accelerator applied thereto are stored for very long periods of time. As stated, the accelerator, however, may be incorporated into the core material during its manufacture. Thus the plastic may be foamed from a system containing the accelerator.

The accelerator may be applied to the surface of the core structure in any desired or suitable manner, for example, by spraying or brushing a solution or suspension of the accelerator. Further, the core may be dipped into a liquid system containing the accelerator or a liquid containing the accelerator may be poured over the cores.

A large variety of foamed plastics may be used as core material for the purposes of this invention. Generally, foamed plastics come into consideration which have a substantially closed pore or cell structure and which possess the necessary mechanical and strength characteristics required for sandwich structures. Suitable plastics for the purpose of this invention are, for example, foams of cellulose acetate, phenol resin, epoxy resin, polyester resin, acrylic resin and methacrylic resin. Particularly preferred are plastic foams on the basis of hard polyvinyl chloride and/or polyurethane. The term polyvinyl chloride foams, as used herein, is deemed to refer also to materials which exhibit a cross-linked structure and which contain at least 40% of polyvinyl chloride.

The unsaturated styrene modified polyester resins may be reinforced by fillers, fibers, such as glass fibers, carbon-, boron- and asbestos fibers, hemp, jute or by fabrics, mats and the like.

The invention will now be described by an example, it being understood, however, that this example is given by way of illustration and not by way of limitation and that many changes may be effected without affecting in any way the scope and spirit of the invention as recited in the appended claims.

EXAMPLE

This experiment was carried out with a core material of pure polyvinyl chloride of 20 mm. thickness. The polyvinyl chloride was foamed to form a closed cell structure and was free of softener. A solution of cobalt naphthenate in acetone having a cobalt naphthenate concentration of 1% was sprayed onto the polyvinyl chloride core in a concentration of 0.075 mg. of cobalt naphthenate per cm.$^2$. The thus prepared cone was stored for six months under different conditions and was then tested. The storage and test conditions were chosen so as to simulate practical conditions (repeated heating to 50° C. for one hour and subsequent cooling to room temperature of about 18° C. as well as irradiation for 50 hours with the ultraviolet light of a quartz lamp).

The core material which had been treated in the indicated manner was then coated with a coating material comprising polyester resin of the type Crystic 189 LV containing 40% of styrene manufactured by Messr. W. Mäder, Killwangen, Switzerland under license of Messr. Scott Bader Co. Ltd., Wellingborough, England. The coating composition also contained 1% of methylethylhydroperoxide (MEKP 40%) and 0.1% of cobalt naphthenate (solution of 1% concentration). The coating material was reinforced with glass-silk mats and the coating was effected on both sides of the core material so as to form a layer of 3 mm. thickness. A stratum or layer of polyester resin was observed to harden on the core after about 45 minutes while the remainder of the coating material hardened after 3 hours only.

The sandwich structure thus obtained was then stored for 14 days and was then subjected to a tearing test in a direction perpendicular to the cover layers. The tearing resistance of the sandwich amounted on the average to about 16 kp./cm.$^2$ while the adhesion strength of the cover layers on the core material was in each case larger than the tearing strength of the core material.

For control purposes the same test was carried out with a core material which had not been treated with cobalt naphthenate. After hardening of the glass fiber-polyester cover layers, which took about 3½ hours, an appreciable softening of the core material caused by the styrene was observed and the cover layer could be easily detached from the core.

What is claimed is:

1. In a method of forming plastic sandwich structures, wherein a core of foamed polyvinyl chloride is coated with a coating material of unsaturated polyester resin which contains styrene as cross-linking component, a hardener and a first accelerator and wherein the coating material upon hardening forms a hard coating on said core, said foamed polyvinyl chloride core being inherently subject to destructive attack by styrene, the improvement which comprises providing an accumulation of a second accelerator in the contact zone between said core and the coating material for promoting cold-hardening of said coating material, whereby hardening of said coating material is accelerated in said contact zone, said accumulation consisting of about 0.05 mg. of said second accelerator per cm.$^2$ core surface.

2. The improvement as claimed in claim 1, wherein said accumulation is provided by applying said second accelerator onto the external surface of said core before the coating with said coating material is effected.

3. The improvement as claimed in claim 1, wherein said accumulation is provided by incorporating said second accelerator into the core.

4. The improvement as claimed in claim 1, wherein said second accelerator is dimethyl aniline, diethyl aniline or a naphthenate, chloride, octoate, linoleate or resinate of cobalt, vanadium, manganese, iron, nickel, copper or cerium.

5. The improvement as claimed in claim 1, wherein said core of foamed polyvinyl chloride is of hard or viscous-hard nature and has a substantially closed pore structure.

6. The improvement as claimed in claim 1, wherein said second accelerator of said accumulation has the same composition as the first accelerator in said coating material.

7. A sandwich body of foamed polyvinyl chloride inherently subject to destructive attack by styrene said body having applied to its surface an amount of an accelerator capable of inducing cold-hardening of styrene-modified polyester resin and having a coating of styrene-modified polyester resin applied thereto.

8. A body as claimed in claim 7, wherein said accelerator is dimethyl aniline, diethyl aniline or a naphthenate, chloride, octoate, linoleate or resinate of cobalt, vanadium, manganese, iron, nickel, copper or cerium.

9. A body as claimed in claim 7, wherein about 0.05 mg. of said accelerator per cm.$^2$ of body surface is applied to the surface of said body.

References Cited

UNITED STATES PATENTS

| 3,583,884 | 6/1971 | Baum | 117—161 K |
| 2,753,276 | 7/1956 | Brochhagen et al. | 117—161 KP |
| 3,154,460 | 10/1964 | Graner et al. | 117—161 K |
| 3,166,434 | 1/1965 | Gauger | 117—57 |
| 3,431,319 | 4/1969 | Baum | 117—138.8 F |
| 3,218,190 | 11/1965 | Patterson et al. | 117—72 |
| 3,240,619 | 3/1966 | Winchester | 117—72 |

U.S. Cl. X.R.

WILLIAM D. MARTIN, Primary Examiner

W. R. TRENOR, Assistant Examiner

117—138.8 UA, E, 161 UB, UC; 156—60; 161—188, 254, 256